United States Patent [19]
Leman et al.

[11] Patent Number: 5,388,961
[45] Date of Patent: Feb. 14, 1995

[54] MECHANICAL ASSEMBLY FOR DETECTING THE PASSING OF A FORCE THRESHOLD IN TRANSLATION

[75] Inventors: Jean-Luc Leman, Aix-En-Provence; Philippe Legendre, Grans; Etienne Rampal, Marseille, all of France

[73] Assignee: Eurocopter France S.A., Marignane, France

[21] Appl. No.: 56,545

[22] Filed: May 5, 1993

[30] Foreign Application Priority Data

May 6, 1992 [FR] France .................. 92 05593

[51] Int. Cl.⁶ .............................................. B64C 27/00
[52] U.S. Cl. ...................................... 416/61; 116/212; 116/285
[58] Field of Search .................. 416/61; 116/212, 285, 116/DIG. 34

[56] References Cited

U.S. PATENT DOCUMENTS

| | | | |
|---|---|---|---|
| 2,134,299 | 10/1938 | Cosner | 116/285 |
| 2,434,870 | 1/1948 | Solovieff | 116/285 |
| 2,673,464 | 3/1954 | Zublin | 116/212 |
| 3,082,733 | 3/1963 | Tamny | 116/DIG. 34 |
| 3,417,727 | 12/1968 | Nemes | 416/61 |
| 4,102,295 | 7/1978 | Crook, Jr. et al. | 116/212 |

FOREIGN PATENT DOCUMENTS 0006051 12/1979 European Pat. Off. .
3938986 11/1990 Germany .

Primary Examiner—Edward K. Look
Assistant Examiner—Mark Sgantzos
Attorney, Agent, or Firm—Nikaido, Marmelstein, Murray & Oram

[57] ABSTRACT

Mechanical assembly for transmitting forces along an axis driven by a substantially axial movement in translation under the effect of a thrust load. This mechanical assembly comprises a transmitting part of the thrust load input movement and a receiving part of the thrust load output movement, said mechanical assembly comprising a detector for detecting the passing of a force threshold represented by a predetermined value of the thrust load, and including an elastic element and an indicator part arranged in such a way that when the thrust load exceeds the threshold value, the thrust load acts on the elastic element and modifies its axial dimension allowing the indicator part to move to the warning position.

19 Claims, 4 Drawing Sheets

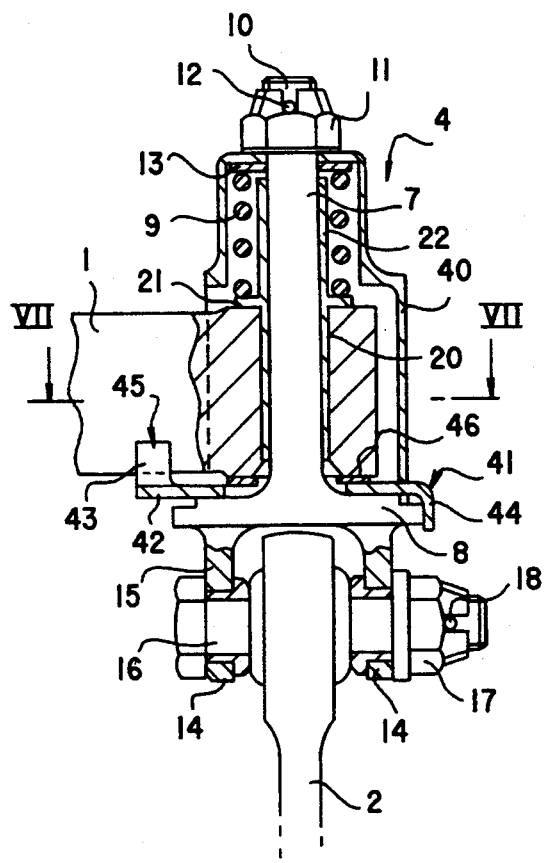
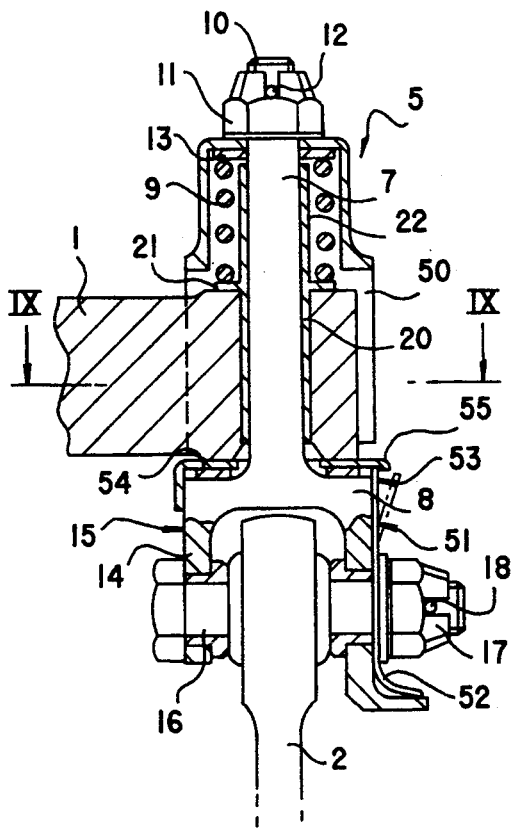
FIG.6  FIG.8
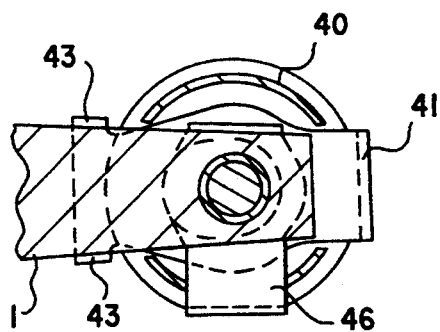
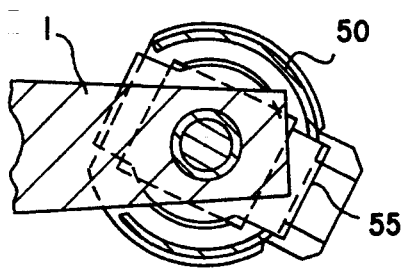
FIG.7  FIG.9

MECHANICAL ASSEMBLY FOR DETECTING THE PASSING OF A FORCE THRESHOLD IN TRANSLATION

BACKGROUND OF THE INVENTION

1. Field of the Invention

This invention relates to a mechanism for detecting the passing of a force threshold in a linear mechanical control channel, and which can be applied more particularly to the pitch control channel of each blade of a helicopter torque-opposing tail rotor.

2. Description of the Prior Art

The pitch articulation of each blade on the hub of an articulated-type helicopter tail rotor is made up of a bearing forming a thrust block, which can be produced by a set of deep-seated ball bearings interposed between the blade connecting sleeve and a journal which is connected to the hub body via the flapping articulation.

The tracks of these ball-bearings of the pitch articulation are subject to heavy axial loading as a result of the centrifugal force transmitted by the blade. They oscillate about a small angular working range and tend in service to become scored in this area. This leads to a potentially large increase in the torque required to make pitch adjustments, and by consequence an increase in the forces developed in the pitch control system on the downside of the servocontrol which could result in this control channel rupturing.

The customary procedure for monitoring the condition of the ball bearing sets is to periodically measure the rotational torque of the connecting sleeves with the tail rotor at a standstill. This measurement is not only awkward to take, but also inaccurate and not representative of the in-service torque since the centrifugal force exerted by the blade on the ball bearing set during this operation is zero. Moreover, this check imposes constraints since it calls for dismantling work and the use of a balance to measure the rotational torque of the sleeves. The results of this measurement are also fairly difficult to interpret.

SUMMARY OF THE INVENTION

The object of the invention is to overcome the above-mentioned drawbacks and to propose a mechanism for detecting the passing of a force threshold reached in service, and which automatically intervenes the moment the force exceeds this threshold value so as to display a mark that can be easily checked by maintenance personnel while allowing continued use of the linear mechanical control channel.

In one embodiment of the invention, the mechanism for detecting the passing of a force threshold is mounted on a mechanical assembly comprising a transmission shaft, and which is subject to a substantially axial movement of translation under the effect of a thrust load. This mechanical assembly essentially comprises one part which transmits the thrust load input movement, another which receives the thrust load output movement, and, integrated between them, a mechanism for detecting the passing of a force threshold represented by a predetermined value of the thrust load and which comprises an integrated thrust block device. This detector for detecting the passing of a force threshold comprises an elastic element and an indicator part which are mutually arranged such that when the thrust load passes the threshold value, the thrust load modifies the axial dimension of the elastic element within the limit authorized by the integrated thrust block device, thereby allowing the indicator part to move to the warning position.

According to various embodiments of the invention, the indicator part moves to the warning position under the effect of the centrifugal force acting on the mechanical assembly, whereas in another embodiment the indicator part moves to the warning position under the effect of an elastic device. In a further embodiment, the indicator part moves to the warning position under the effect of the thrust load itself.

To facilitate as much as possible the mounting of this mechanism for detecting the passing of a force threshold in a mechanical control channel, the detector is mounted on the transmitting part. The detector comprises a rod which traverses the transmitting part. One end of the rod has a flange which is connected to the receiving part, and the other, in its section outside the transmitting part, an elastic element which bears, on the one hand, against the transmitting part, and on the other hand, against a case in which this elastic element is housed. The case and rod are held in place by assembly means. Preferably, the elastic element is a compression spring, and the means for assembling the case and rod comprise a nut which screws onto the threaded end of this rod and which is locked in position by a pin to prevent it from unscrewing.

To produce the detector's integrated thrust block, the detector comprises a ferrule mounted in the bore of the transmitting part so as to provide a passage for the rod. The rod can thus slide in the ferrule. The ferrule is also provided with a collar which bears against the corresponding face of the transmitting part under the effect of the compression spring which is thus mounted between this collar and the case.

The ferrule also comprises a tubular prolongation inside the spring. The length of the prolongation is chosen in such a way that clearance is provided between its tubular end and the washer located on the top inside the case, and that when the spring is compressed over a length equal to this clearance, the tubular end of the ferrule abuts against the washer located on the top inside the case, thus limiting, in an absolute way, the relative displacement of the transmitting part with respect to the receiving part to solely the low value of the play.

To improve the precision of the detector mechanism in accordance with the invention, the detector comprises means for adjusting the play, which corresponds to the desired modification of the axial dimension of the elastic element, for example of the compression spring, that will allow the indicator part to move to the warning position.

Preferably, these means for adjusting the play of the detector comprise an adjustment washer traversed by the rod, arranged between the case and the elastic element, for example the compression spring, which allows the indicator part to move to the warning position.

In one embodiment of the mechanism for detecting the passing of a force threshold, according to the invention the indicator part is made up of a circular plate which is traversed by the rod, and mounted between the flange and the transmitting part. The indicator part is arranged inside the case, and comprises a tongue which protrudes outside this case and whose plane is substantially perpendicular to that of the circular plate. In addition, this tongue is arranged immediately in front of an area of the case bearing a mark. Thus, when the thrust load exceeds the threshold value, the indicator part is then freed in rotation and turns under the effect of the centrifugal force applied to the entire mechanical command channel until it abuts against the case in the position corresponding to the warning position, thus leaving the marked area of the case uncovered.

In another embodiment of the mechanism for detecting the passing of a force threshold in accordance with the invention, the indicator part is made up of a plate which is traversed by the rod, and which is mounted between the flange and the transmitting part. This indicator part passes through each side of the case, and comprises, on the one hand, two tongues which are both in a plane substantially perpendicular to the plate, and on the other hand, a stop tab. Each of these two tongues is located in front of an area on the transmitting part which bears a mark. In addition, the hole in the plate through which the rod passes is oblong. Thus when the thrust load exceeds the threshold value, the indicator part is freed and moves under the effect of the centrifugal force applied to the linear mechanical command channel until the other side of the oblong hole abuts against the rod, which corresponds to the warning position, thereby uncovering the two areas marked on the transmitting part. In another embodiment of the detector in accordance with the invention, the indicator part is made up of a plate mounted in a plane substantially perpendicular to the flange and to which it is rigidly locked. This plate has an elastic end, which is held in place by a retaining element. This retaining element is traversed by the rod and mounted between the flange and transmitting part. The retaining element also has a lipped edge which retains the elastic end of the plate and holds it in position. Thus when the thrust load exceeds the threshold value, the elastic end of the indicator part escapes from the retaining element and moves to the warning position.

In another embodiment of the detector in accordance with the invention, the indicator part is made up of a plate whose two ends are fixed respectively to a prolongation of the ferrule and to a prolongation of the case. This plate lies in a plane substantially parallel to the axis of displacement. Thus when the thrust load exceeds the threshold value, the section of the indicator part located between the fixing points breaks, which corresponds to the warning position.

In accordance with the invention, these various embodiments can refer to a mechanical assembly mounted on the tail rotor of a helicopter. In this case, the part that transmits the thrust load input movement is each arm of the rotor control plate, and the part that receives the thrust load output movement is the pitch control rod of the corresponding blade.

In this last type of application, the flange of the detector comprises two branches which are substantially perpendicular to the plane of the flange and which form a fork. The pitch control rod of the corresponding blade is fitted to the fork by means of a spindle. This spindle is locked to the fork by a nut locked by a pin. The fork is also oriented with respect to the arm of the control plate by means of an orientation element.

In the embodiment of the detector which comprises an indicator part made up of a plate mounted in a plane substantially perpendicular to the flange, this plate is traversed by the spindle of the pitch control rod, and is locked by the nut of this spindle.

The mechanism for detecting the passing of a force threshold in accordance with the invention, and more particularly in the application for controlling the pitch of the blades of a helicopter torque-opposing rotor, has the advantage of allowing more thorough and easier determination of the dismantling and reconditioning of the ball bearing set of the articulation when the force transmitted has exceeded the predetermined threshold value. In addition, this system is automatic, and works during operation, thus avoiding any delicate measurement or interpretation by manual means whose precision can vary from one measurement to the next.

BRIEF DESCRIPTION OF THE DRAWINGS

However the invention will be better understood from the following detailed and non-limiting description of a number of embodiments of the invention. It must be read in conjunction with the accompanying drawings in which:

FIG. 6 is an axial cross-sectional view similar to FIG. 3 of another embodiment of the detector in accordance with the invention;

FIG. 7 is a cross-sectional view along the line VII—VII shown in FIG. 6;

FIG. 8 is a cross-sectional view similar to FIG. 3 of another embodiment of the detector in accordance with the invention;

FIG. 9 is a cross-sectional view along the line IX—IX shown in FIG. 8;

DETAILED DESCRIPTION OF THE PREFERRED EMBODIMENTS

Figure 1:
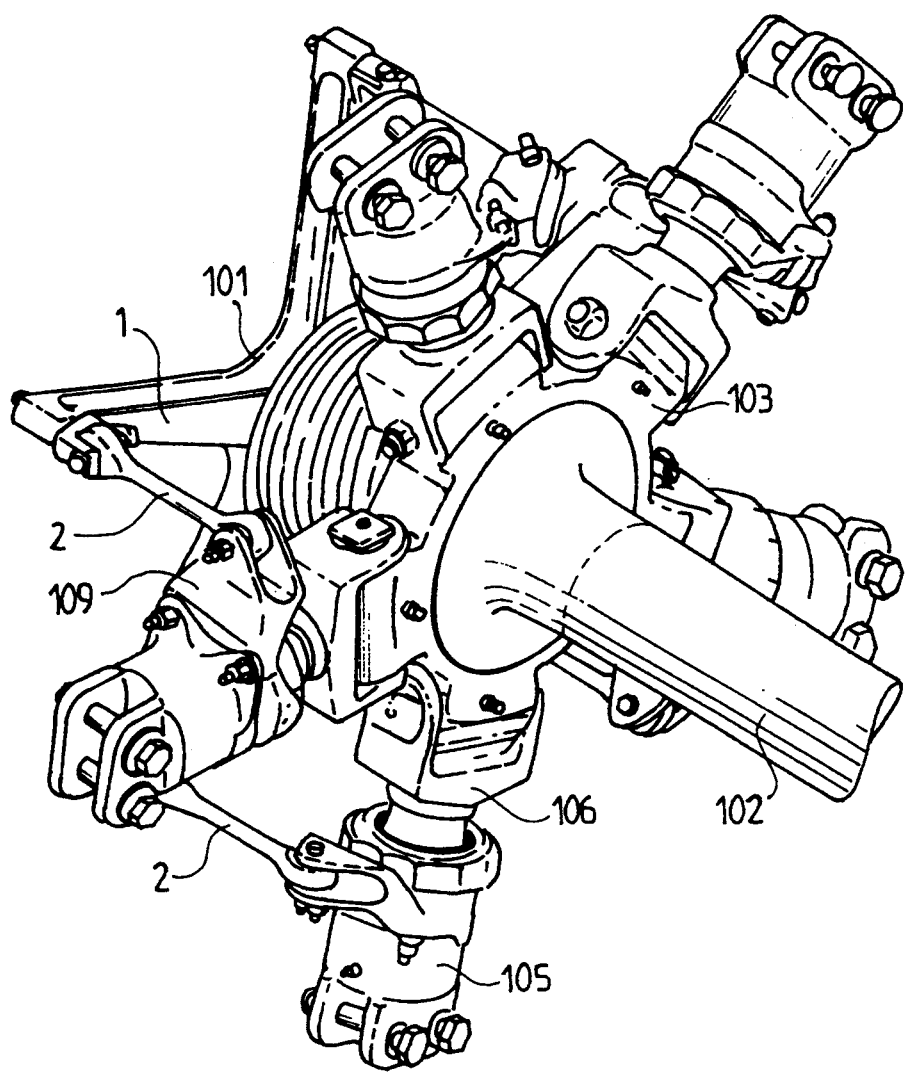
FIG. 1 is a perspective view of the entire hub assembly of a helicopter torque-opposing tail rotor on which the detector in accordance with the invention can be mounted.
Figure 2:
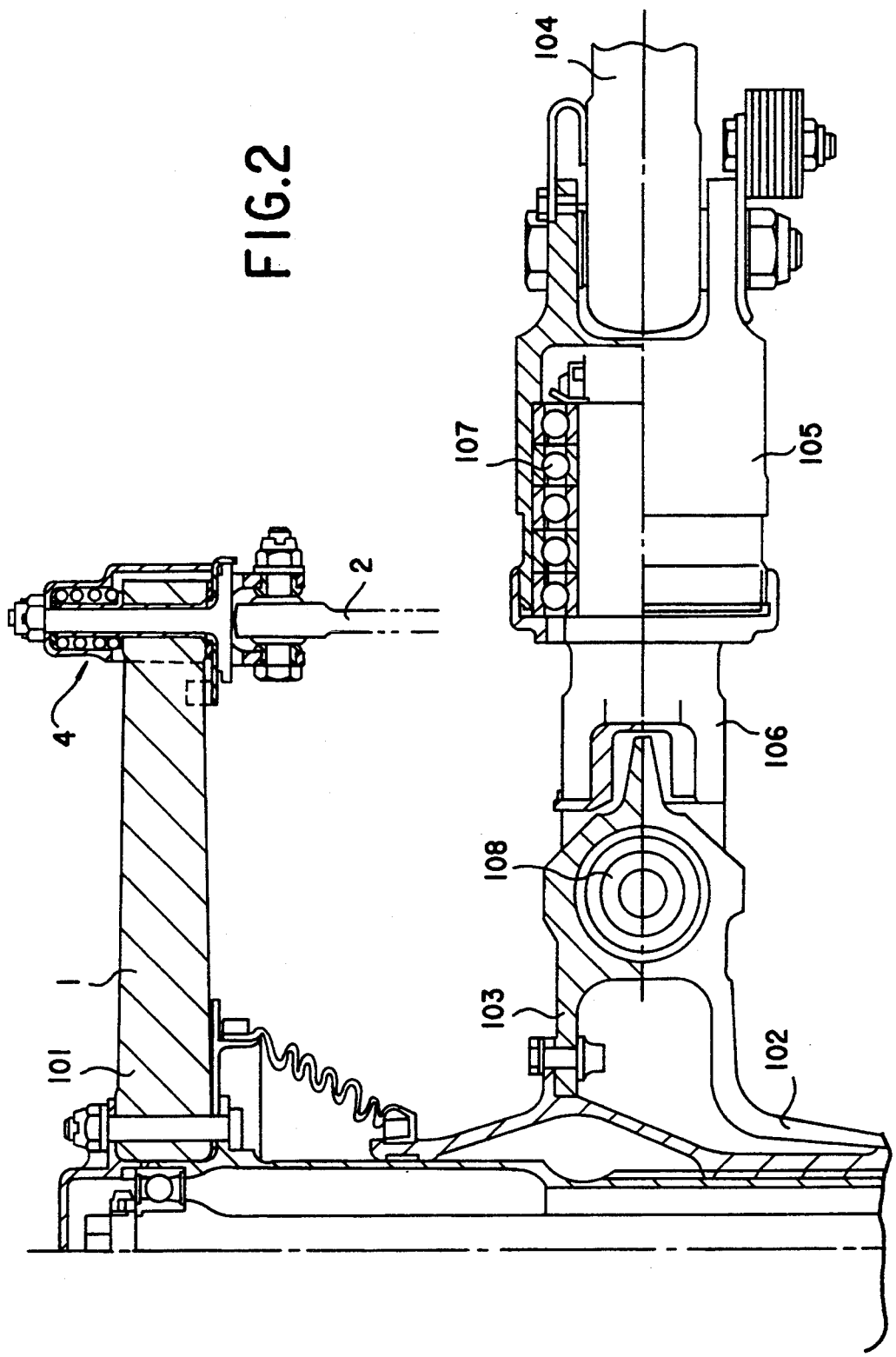
FIG. 2 is an axial cross-sectional view of the tail rotor assembly shown in FIG. 1, on which a detector mechanism has been arranged.

FIG. 1 shows a perspective view of a 5-bladed tail rotor hub of a helicopter, and FIG. 2 an axial cross-sectional view of the same tail rotor. The tail rotor comprises a drive shaft 102 carrying a hub body 103 which is connected to each of the five blades 104 via a journal 106 and a blade connecting sleeve 105. A pitch control plate 101 is mounted at the end of a shaft carried by motor shaft 102, and comprises five arms 1 corresponding to each blade 104. A pitch lever 109 is fixed to each blade connecting sleeve 105, said pitch lever being connected to the corresponding arm 1 of control plate 101 by a control rod 2. The pitch articulation of each blade 104 is made up of a bearing forming a thrust block, produced by a set of five deep-seated bearings 107 interposed between the connecting sleeve 105 of the corresponding blade 104, and the journal 106 which is connected to hub body 103 via flapping articulation 108.

Each arm 1 of control plate 101 and the corresponding control rod 2 together with its connection pieces forms a mechanical assembly, which has a transmission shaft and which is driven by a substantially axial movement of translation, i.e. parallel to the axis of the tail rotor. This movement of translation is performed under the effect of a thrust load originating from control plate 101, and which is transmitted to corresponding arm 1. Each of these mechanical assemblies thus comprises one part which transmits the thrust load input movement, i.e. arm 1 of control plate 101, and one part which receives the thrust load output movement, i.e. pitch control rod 2 of the corresponding blade. A detector 4 for detecting the passing of a force threshold represented by a predetermined thrust load value is arranged in accordance with the invention on each of these mechanical assemblies.

Figure 3:
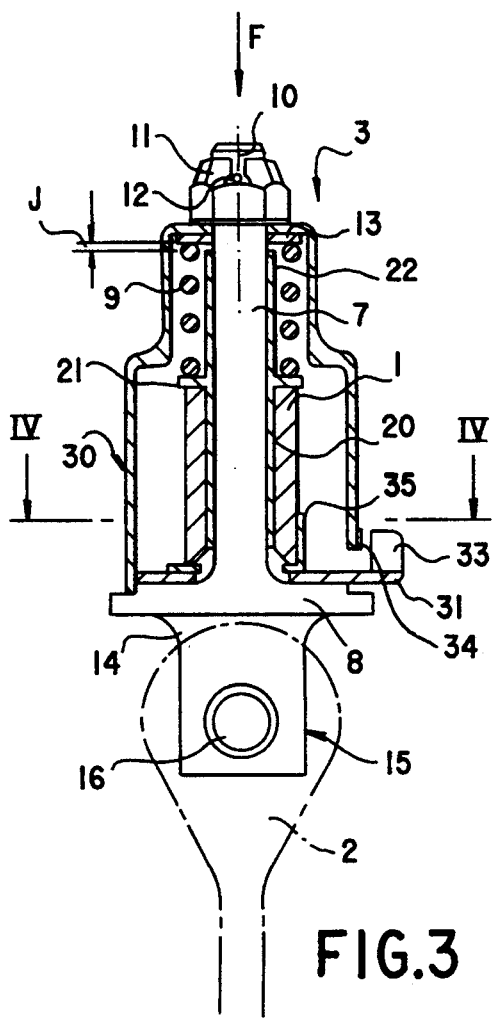
FIG. 3 is an axial cross-sectional view of the entire detector in accordance with the invention mounted on a helicopter tail rotor shown in FIGS. 1 and 2.

FIG. 3 shows a first embodiment of the invention, with a detector referenced 3 in its entirety, the mechanical assembly being shown in axial cross-section along a line perpendicular to the radial plane of the corresponding arm 1. A detector 3 is mounted on each arm of control plate 101. It comprises a rod 7 with a ferrule 20, a compressed spring type elastic element 9, a case 30, and an indicator part 31. Ferrule 20 is mounted in a bore provided for this purpose in arm 1. Ferrule 20 receives rod 7 which passes through it and in which it can slide freely. One end of rod 7 has a flange 8 which is connected to the receiving part, i.e. control rod 2, and the other end, in the section outside arm 1, is fitted with compression spring 9, which bears, on the one hand, against arm 1, and on the other hand, against the bottom of case 30. Case 30 and rod 7 are held in place by holding means in the form of a nut 11 which screws onto the threaded end 10 of rod 7. Nut 11 is also locked by pin 12 to prevent it from unscrewing.

Flange 8 comprises two branches 14 substantially perpendicular to flange 8 which form a fork 15. Control rod 2 connects to fork 15 by means of a spindle 16 locked to fork 15. Fork 15 is also oriented with respect to arm 1 of control plate 101 by means of an orientation plate 35.

Ferrule 20 is force fitted into the corresponding bore of arm 1 of control plate 101. Ferrule 20 comprises a collar 21, which bears against the corresponding face of arm 1, and which receives compression spring 9. Orientation plate 35 and indicator part 31 are arranged on the other side of the bore provided in this arm 1, and are both traversed by rod 7 which then engages and slides in ferrule 20. All these parts are enclosed in case 30 which serves as a housing for compression spring 9, case 30 being locked onto rod 7 by means of nut 11 and pin 13.

Ferrule 20 also comprises beyond collar 21 a tubular prolongation 22 inside compression spring 9, whose length is determined such that when case 30 is in place and bears against flange 8, a clearance "J" is provided between the tubular prolongation 22 and the adjusting washer 13 inside case 30.

When the thrust load transmitted by arm 1 to control rod 2 via rod 7 exceeds the predetermined force threshold value, the elastic element, i.e. compression spring 9 is compressed, such that the modification of its axial dimension allows indicator part 31 to move to the warning position.

When the compression distance of the spring reaches a value equal to the clearance provided between the end of the tubular prolongation of collar 22 and the adjusting washer 13 inside of case 30, the bottom of the case 30 abuts against the flange 8 which thus limits in an absolute fashion the relative displacement of control plate 101 with respect to control rod 2.

In order to improve the accuracy of this detector in accordance with the invention, means are provided for adjusting the clearance in the form of an adjustment washer 13. Adjustment washer 13 is traversed by rod 7, and arranged between case 30 and compression spring 9. The length of the section of ferrule 20 which receives compression spring 9 is determined such that this washer 13 abuts against the end of the prolongation of ferrule 20 after a distance of travel corresponding to the desired modification of the axial dimension of compression spring 9, i.e. of the play of the detector which allows indicator part 31 to move to the warning position.

Figure 4:
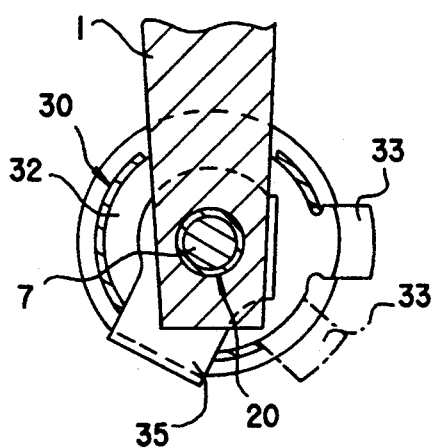
FIG. 4 is a cross-sectional view along the line IV—IV shown in FIG. 3.
Figure 5:
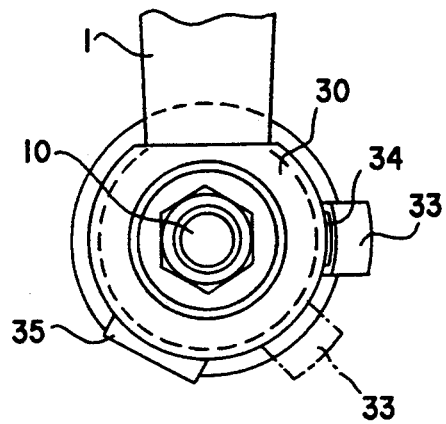
FIG. 5 is a view from above of FIG. 3.

Indicator part 31 of detector 3 is made up of a circular plate 32 which can turn in case 30. Circular plate 32 is traversed by rod 7, and is mounted between flange 8 and orientation plate 35 of control rod 2. Indicator part 31 comprises, on the outside of case 30, a tongue 33 provided on the periphery of circular plate 32, and which passes through a port made in case 30. Tongue 33 lies in a plane substantially perpendicular to circular plate 32, and it is located in front of an area 34 made on case 30. This area 34 has a mark which could be a red-colored reference mark, for example. When the thrust load exceeds the predetermined threshold value, compression spring 9 is compressed by a value equal to the clearance of the detector thus releasing indicator part 31 in rotation which can then turn under the effect of the centrifugal force and abut against the other face of the port through which tongue 33 passes in the position corresponding to the warning position represented by dotted lines in FIGS. 4 and 5. In moving to this position, tongue 33 exposes area 34 of case 30 which the operator responsible for checking the device can see after the tail rotor has stopped.

Another embodiment of the invention which also refers to the pitch control channel of the blades of a helicopter torque-opposing tail rotor is shown in FIGS. 6 and 7. The structure of the mechanism for detecting the passing of a force threshold, referenced 4 in its entirety, is similar to that of detector 3 described above. Detector 4 comprises a ferrule 20 with its collar 21 and prolongation 22 mounted in arm 1 of the control plate, and inside of which slides rod 7. Rod 7 also has a flange 8 at one of its ends which is connected to the pitch control rod 2. The other end of rod 7 has a compression spring 9 which bears, on the one hand, against collar 21 on ferrule 20, and on the other hand, on a case 40, said case being held in position with compression spring 9 by means of nut 11 with pin 12 which screws onto the threaded end 10 of rod 2. As in the preceding case, flange 8 of rod 7 comprises two branches 14 substantially perpendicular to this flange 8 and which form a fork 15 to which the pitch control rod 2 is fitted by means of a spindle 16. This spindle 16 is locked to fork 15 by a nut 17 and locking pin 18. Fork 15 is also oriented with respect to arm 1 of the control plate by means of an orientation plate 46.

As in the preceding case, detector 4 comprises an adjustment washer 13 traversed by rod 7, and which is arranged between case 40 and compression spring 9.

In this embodiment, indicator part 41 of detector 4 is made up of a plate 42 traversed by rod 7. Plate 42 is mounted between flange 8 and orientation plate 46 which bears against arm 1 of control plate 101. As can be seen in FIG. 7, this indicator part 41 is designed in such a way that its two ends pass through corresponding passage ports on each side of case 40. This indicator part 41 comprises, on the one hand, at one of its ends, two tongues referenced 43, and on the other hand, at its other end, a stop tab 44. Each of the two tongues 43 is located in front of an area 45 made on arm 1 of control plate 101. This area has a mark, more precisely a red reference mark. In addition, the hole in plate 42 through which rod 7 passes is oblong. At the other end of the plate, stop tab 44 bears against the periphery of the flange 8 of rod 7. Finally, orientation plate 46, which is traversed by rod 7, has a tab at each of its ends which bears, on the one hand, against one side of arm 1 of control plate 101, and on the other hand, against a flat part made on the periphery of plate 8 of rod 7. In this way, pitch control rod 2 is oriented at the desired angle with respect to arm 1 of control plate 101.

In this type of detector 4, indicator part 41 is freed when the thrust load exceeds the predetermined force threshold. Indicator part 41 then moves under the effect of the centrifugal force until the other side of the oblong hole, i.e. the side of the oblong hole situated in the proximity of the two tongues 43, abuts against rod 7. When this side of the oblong hole abuts against rod 7, indicator part 41 is then in the warning position, and has accordingly exposed the two areas 45 marked in red on arm 1 and which are thus immediately visible to the operator responsible for the check.

The embodiment of the invention shown in FIGS. 8 and 9 also refers to the pitch control channel of the blades of a helicopter torque-opposing rotor, and comprises a detector mechanism, referenced 5 in its entirety, similar in structure to that of detectors 3 and 4 described above. Detector 5 comprises a ferrule 20 with its collar 21, and its prolongation 22, inside of which slides rod 7 carrying, on the one hand, flange 8 connected to pitch control rod 2, and on the other hand, at its other end, a case 50 in which compression spring 9 is housed mounted on ferrule 20. The assembly is locked by means of nut 11 and locking pin 12 mounted on the threaded end 10 of rod 7. As in the case of detectors referenced 3 and 4, the detector referenced 5 comprises adjustment washer 13 which is arranged between case 50 and compression spring 9, and which is traversed by rod 7. In this detector 50, the indicator part referenced 51 is made up of a plate 52 mounted in a plane substantially perpendicular to flange 8. Plate 52 is also rigidly locked to flange 8 by spindle 16 of pitch control rod 2 which traverses plate 52. Plate 52 is thus locked between nut 17 of spindle 16 and one of the two branches 14 substantially perpendicular to flange 8 and which together form the fork 15 between which control rod 2 is fitted by means of spindle 16.

In accordance with the invention, plate 52 has an elastic end 53 which is held in place by a retaining element 54. Retaining element 54 is traversed by rod 7 and arranged between flange 8 of rod 7 and arm 1 of control plate 101. Retaining element 54 has, on the one hand, a lipped edge 55 which retains and holds the elastic end 53 of plate 52 in place, and on the other hand, at its other end, a lipped edge 56 which bears against a flat part provided on the periphery of flange 8 along the prolongation of branch 14 of fork 15, allowing pitch control rod 2 to be oriented as required. The other branch 14 of fork 15 on which bears indicator part 51 has a lipped end against which the corresponding end of plate 52 of indicator part 51 bears. When the thrust load exceeds the predetermined force threshold, the elastic end of the indicator part 51 escapes from the holding element and moves to the warning position.

Figure 10:
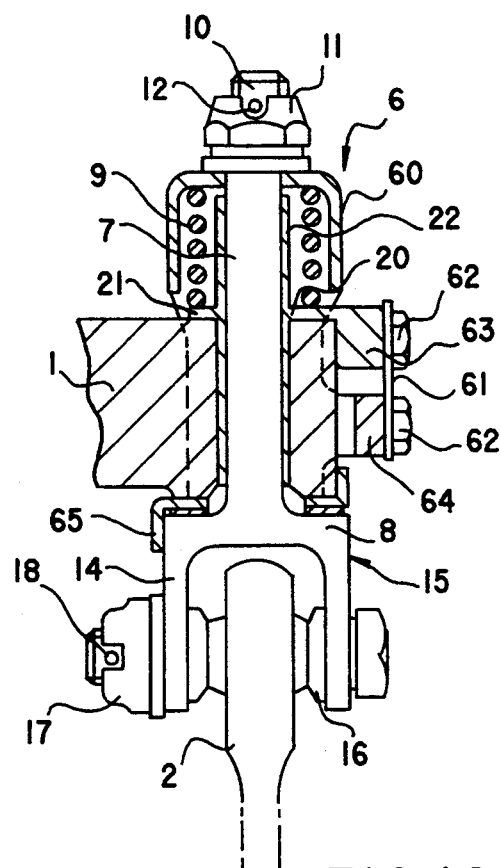
FIG. 10 is a cross-sectional view similar to FIG. 3 of another embodiment of the detector in accordance with the invention.

FIG. 10 shows another embodiment of the invention which also refers to the pitch control channel of a helicopter torque-opposing rotor. In this embodiment, a detector referenced 6 in its entirety, is mounted on arm 1 of control plate 101, and comprises a ferrule 20 with its collar 21 and prolongation 22, in which rod 7 with its flange 8 and threaded end 10 is fitted. Compression spring 9 is also mounted on ferrule 20 and is housed in a case 60 which is locked by nut 11 with pin 12. In the same way as in the previously described and illustrated embodiments, flange 8 comprises two branches 14 which form fork 15 between which control rod 2 is fitted by means of spindle 16 and the locking nut 17 and pin 18. In order to suitably orientate pitch control rod 2, the device comprises a holding and orientation element 65 comprising a folded edge at each of its ends, said folded edges bearing, on the one hand, against one of the sides of arm 1, and on the other hand, against a flat part arranged on the periphery of flange 8 along the prolongation of the corresponding branch 14.

In this embodiment of the invention, indicator part 61 of detector 6 is made up of a plate produced from non-ductile material of low mechanical strength which is fixed at its two ends by a screw 62. One end of indicator part 61 bears against and is fixed to a prolongation 64 of case 60, and the other end of indicator 61 bears against and is fixed to a prolongation 63 of ferrule 20, more precisely in the area of collar 21. Indicator part 61 is thus arranged in a plane substantially parallel to the axis of displacement, i.e. the axis of rod 7. When the thrust load transmitted by the mechanism exceeds the predetermined threshold value, the section of the indicator part located between the two fixing bolts 62 breaks. The rupturing of indicator part 61 thus corresponds to the warning position of the device.

In another embodiment, the plate produced from a non-ductile material of low mechanical strength can also comprise a circuit conductive to electricity that is integral with the said plate either on its surface or incorporated in it in such a way that when this indicator part ruptures, so does the electric circuit, this interruption then able to trigger a warning device and/or be recorded in the aircraft flight recorder.

It can be seen that in all the previously described embodiments, the different embodiments work in the same way, i.e. under a tractive pull, pitch control rod 2 exerts a compression action on spring 9, said spring 9 having already been compressed according to a calibration force compatible with the mechanical strength of the components of the command channel located downside of the system's servocontrol. As soon as the force exerted by the control rod 2 exceeds the calibration force of compression spring 9, spring 9 continues to compress until the bottom of case 30 abuts against the end of prolongation 22 of ferrule 20. This results in indicator part 31, 41, 51 or 61 being freed under the axial load, which can then, depending on the case, turn or move in translation under the action of the centrifugal field. In moving to a new position, the tongues of these indicator parts unmask the painted red mark or marks on a control panel on the case. The indicator part stays in this new position from the moment the force on the control rod becomes less than the calibration force of the compression spring 9 up to and including the moment the rotor stops. The appearance of the warning signal calls for rapid intervention on the corresponding bearing set 107.

Note that the device of the invention, which can be applied in particular to the tail rotor of a helicopter, is also applicable to any mechanical assembly comprising a transmission shaft, and which is driven by a substantially axial movement of translation, this mechanical assembly comprising a part which transmits the thrust load input movement and a part which receives the thrust load output movement. This mechanical assembly in accordance with the invention comprises a detector for detecting the passing of a force threshold represented by a predetermined value of the thrust load, and which always has an elastic element and an indicator part which are arranged such that when the thrust load exceeds the threshold value, the thrust load acts on the elastic element to modify its axial space thus allowing the indicator part to move to the warning position. Moreover, it should also be noted that without moving outside the scope of the invention, the indicator part can move to the warning position under the effect of an elastic device, such as a spring, or under the effect of centrifugal forces as described previously, or under the effect of the thrust load as in the case shown in FIG. 10.

Attention is also drawn to the fact that while all the solutions described are applied to pitch control rods 2 acted upon in traction, the device could also be applied, without moving outside the scope of the invention, to control rods acted upon in compression by simply changing the arrangement of the different elements making up the detectors for detecting the passing of a force threshold.

The device of the invention is ideal for permanent monitoring of the condition of the pitch articulations of a helicopter tail rotor, and perfectly meets the new certification requirements which insist on a system for monitoring condition and wear, in which it constitutes an active element. The device of the invention can also be applied in a general way to detecting the passing of a force threshold in a linear mechanical command chain by simply rearranging the layout of the device's component parts.

We claim:

1. Mechanical assembly for transmitting force along an axis driven by a substantially axial movement of translation under the effect of a thrust load on a rotating body, this mechanical assembly comprising a part which transmits the thrust load input movement, and a part which receives the thrust load output movement, wherein the said mechanical assembly comprises a detector for detecting the passing of a force threshold represented by a predetermined value of the thrust load, which has an elastic element and an indicator part which are arranged such that when the thrust load exceeds the threshold value, the thrust load acts on the elastic element to modify its axial dimension allowing the indicator part to move to a warning position.

2. Mechanical assembly as claimed in claim 1, wherein the indicator part moves to the warning position under the effect of centrifugal force.

3. Mechanical assembly as claimed in claim 1, wherein the indicator part moves to the warning position under the effect of an elastic device.

4. Mechanical assembly as claimed in claim 1, wherein the indicator part is configured to move to the warning position under the effect of centrifugal force after passing the force threshold represented by the predetermined value of thrust load.

5. Mechanical assembly as claimed in claim 1, wherein the detector for detecting the passing of a force threshold is mounted on the transmitting part and comprises a rod traversing the transmitting part, said rod having at one of its ends a flange connected to the receiving part and having at its other end, in the section outside the transmitting part, an elastic element which bears, on the one hand, against the transmitting part, and on the other hand, against a case in which this elastic element is housed, the case and the rod being held in place by retaining means.

6. Mechanical assembly as claimed in claim 5, wherein the elastic element of the detector for detecting the passing of a force threshold is a compression spring.

7. Mechanical assembly as claimed in claim 5, wherein the means for holding the rod and the case are made up of a nut which screws onto the threaded end of the rod, the nut being locked and prevented from unscrewing by a pin.

8. Mechanical assembly as claimed in claim 1, wherein the modification of the axial dimension of the elastic element is limited by a thrust block.

9. Mechanical assembly as claimed in claim 8, wherein the detector for detecting the passing of a force threshold comprises a ferrule, mounted in the bore of the transmitting part, and which provides a passage for the rod and in which the rod can slide, said ferrule comprising, on the one hand, a collar which bears against the corresponding surface of the transmitting part in such a way that this collar receives the compression spring, and on the other hand, beyond the collar, a tubular prolongation whose length is such that when the case is in place and bearing against the flange, clearance is provided between the tubular prolongation and the adjusting washer inside the case.

10. Mechanical assembly as claimed in claim 9, wherein the detector for detecting the passing of a force threshold comprises means for adjusting the play of this detector, which corresponds to the desired modification of the axial dimension of the elastic element that allows the indicator part to move to the warning position.

11. Mechanical assembly as claimed in claim 10, wherein the means for adjusting the play of the detector for detecting the passing of a force threshold comprise an adjusting washer traversed by the rod and arranged between the case and the elastic element; said washer works in conjunction with the end of the ferrule by abutting against said end after a distance of travel corresponding to the desired modification of the axial dimension of the elastic element that allows the indicator part to move to the warning position.

12. Mechanical assembly as claimed in claim 5, wherein the indicator part of the detector for detecting the passing of a force threshold is made up of a circular plate traversed by the rod and mounted between the flange and the transmitting part, said indicator part being arranged inside the case and comprising a tongue outside of the box in a plane substantially perpendicular to the circular plate, this tongue, being situated in front of an area of the case provided with a mark, such that when the thrust load exceeds the threshold value, the indicator part is then freed in rotation and it turns under the effect of the centrifugal force to abut against the case in the position corresponding to the warning position, thus exposing the area of the case that has the mark.

13. Mechanical assembly as claimed in claim 5, wherein the indicator part of the detector for detecting the passing of a force threshold is made up of a plate traversed by the rod and mounted between the flange and the transmitting part, said indicator part traversing each side of the case and comprising, on the one hand, two tongues in a plane substantially perpendicular to the plate, and on the other hand, a stop tab, each of the two tongues being located in front of an area bearing a mark of the transmitting part, the hole in the plate through which the rod passes being oblong, such that when the thrust load exceeds the threshold value, the indicator part is then freed and moves under the effect of the centrifugal force until the other side of the oblong hole abuts against the rod, thus uncovering the two marked areas on the transmitting part and which corresponds to the warning position.

14. Mechanical assembly as claimed in claim 5, wherein the indicator part of the detector for detecting the passing of a force threshold is made up of a plate, mounted in a plane substantially perpendicular to the flange and which is rigidly locked to this flange, said plate having an elastic end which is held in place by a retaining element traversed by the rod and mounted between the flange and the transmitting part, said retaining element having a lipped edge which retains and holds the elastic end of the plate in such a way that when the thrust load exceeds the threshold value, the elastic end of the indicator part escapes from the retaining element and moves to the warning position.

15. Mechanical assembly as claimed in claim 5, wherein the indicator part of the detector for detecting the passing of a force threshold is made up of a plate produced from a non-ductile material of low mechanical strength and which is fixed at its two ends, on the one hand, to a prolongation of the ferrule, and on the other hand, to a prolongation of the case, said plate being located in a plane substantially parallel to the axis of displacement, such that when the thrust load exceeds the threshold value, the section of the indicator part located between the fixing points breaks, which corresponds to the warning position.

16. Mechanical assembly as claimed in claim 15, wherein the plate produced from a non-ductile material of low mechanical strength also comprises an electrical circuit which is integral with the said plate along its longitudinal dimension such that the rupturing of this indicator part interrupts the electrical circuit and triggers a remote warning device.

17. Mechanical assembly as claimed in claim 1, wherein the mechanical assembly is mounted for each of the blades of a helicopter tail rotor, the transmitting part of the thrust load input movement being the arm of the rotor control plate for the considered blade, and the receiving part of the thrust load output movement being the pitch control rod of the blade.

18. Mechanical assembly as claimed in claim 17, wherein the flange of the detector for detecting the passing of a force threshold comprises two branches arranged substantially perpendicular to said flange in such a way as to form a fork to which the control rod is fitted by means of a spindle that is locked onto this fork by a nut with a pin, said fork being oriented with respect to the arm of the control plate by means of an orientation element.

19. Mechanical assembly as claimed in claim 14, wherein the indicator part formed by the plate is traversed by the spindle of the control rod and is locked by the nut of this spindle.

* * * * *